United States Patent
Baughn et al.

[11] 3,804,527
[45] Apr. 16, 1974

[54] MEASUREMENT OF RADIATION CONFIGURATION FACTOR

[75] Inventors: James W. Baughn, Stanford; George A. Monroe, Off Sylale; August J. Ronsse, Los Altos, all of Calif.

[73] Assignee: Itek Corporation, Lexington, Mass.

[22] Filed: June 22, 1970

[21] Appl. No.: 59,829

Related U.S. Application Data

[62] Division of Ser. No. 739,675, June 25, 1968, abandoned.

[52] U.S. Cl................ 356/157, 356/165, 356/171, 350/294
[51] Int. Cl.... G01b 11/28, G01b 9/08, G01b 11/24
[58] Field of Search ......... 356/227, 156, 157, 165, 356/171; 350/294

[56] References Cited
UNITED STATES PATENTS

| | | | |
|---|---|---|---|
| 2,371,495 | 3/1945 | Benford | 95/15 |
| 2,592,264 | 4/1952 | Fultz | 356/164 |

*Primary Examiner*—David Schonberg
*Assistant Examiner*—Conrad Clark
*Attorney, Agent, or Firm*—Homer O. Blair; Robert L. Nathans; Gerald H. Glanzman

[57] ABSTRACT

Method of and apparatus for measuring thermal radiation geometric configuration factors — any such factor being that fraction of the total radiant energy emitted from an energy-radiating surface which is incident on an energy-receiving surface.

The method includes the steps of forming an image of the projected area of an energy-radiating surface at a selected location along an energy-receiving surface, making a photographic reproduction of such image, repeating the image-forming and image-reproduction steps at a plurality of selected locations along such energy-receiving surface, providing a configuration factor grid for subdividing any such image into weighted areas equivalent to known thermal radiation geometric configuration factors, and inspecting each photographic reproduction with such grid to measure the area of the image thereon in terms of its radiation configuration factor, thereby enabling all such factors to be averaged to derive a value for the entire energy-receiving surface. The apparatus includes an image-forming assembly comprising primary and secondary mirrors of hemispherical configuration for collecting and forming an image of the energy-radiating surface as the area thereof is projected onto the primary mirror, and further comprising an intermediate optical system for receiving such formed image as redirected thereto by the secondary mirror and for transmitting to and focusing such image at an image plane for photographic reproduction.

4 Claims, 7 Drawing Figures

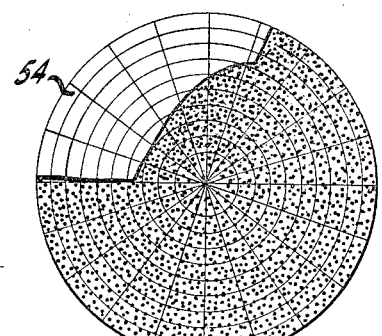
FIG.-2
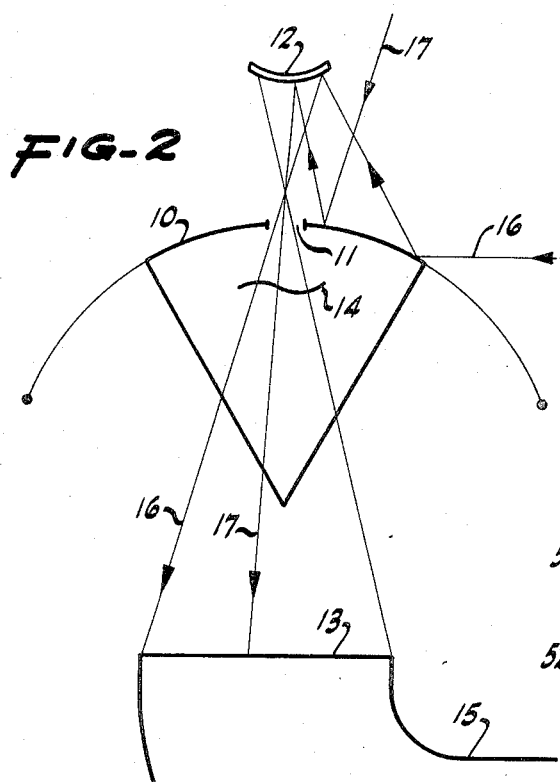
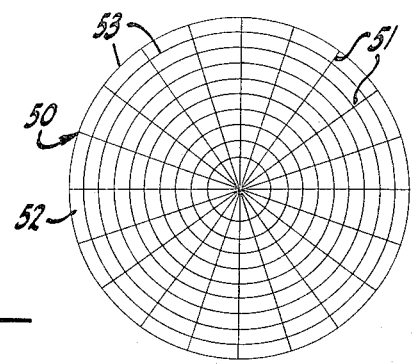
FIG.7
FIG.5
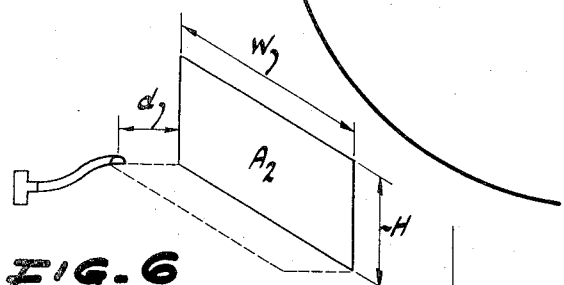
FIG.6
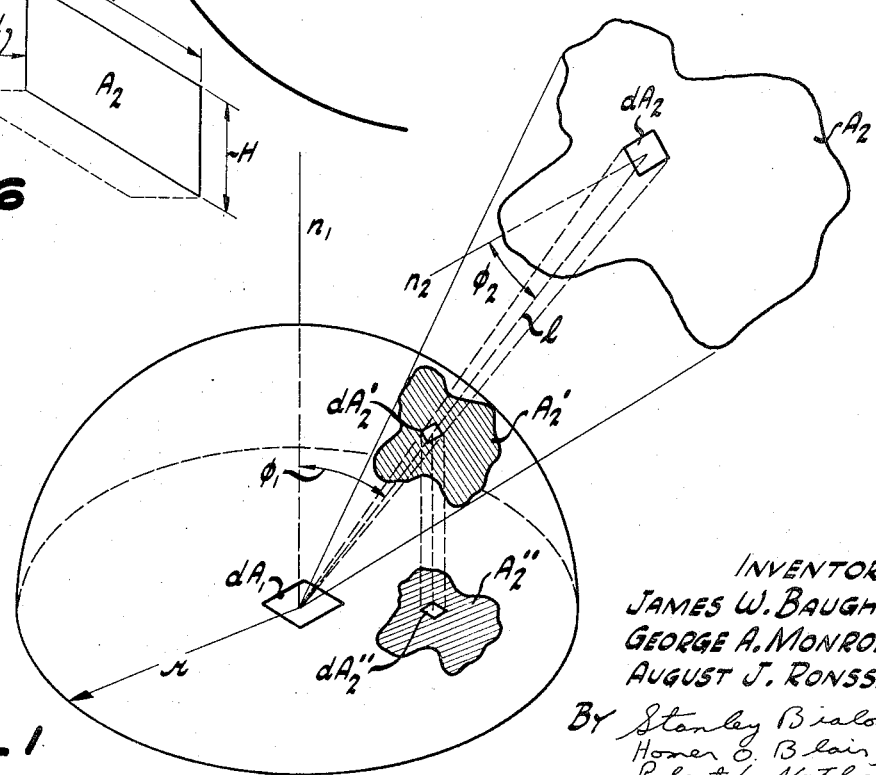
FIG.1
INVENTORS
JAMES W. BAUGHN
GEORGE A. MONROE
AUGUST J. RONSSE
BY Stanley Bialos,
Homer O. Blair, &
Robert L. Nathans
ATTORNEYS

PATENTED APR 16 1974

INVENTORS
JAMES W. BAUGHN
GEORGE A. MONROE
AUGUST J. RONSSE
By Stanley Bialos,
Homer O. Blair, &
Robert L. Nathans
ATTORNEYS

MEASUREMENT OF RADIATION CONFIGURATION FACTOR

This is a division of application Ser. No. 739,675, filed June 25, 1968 now abandoned.

CHARACTERIZATION OF THE INVENTION

The invention is characterized in one aspect thereof by a pair of spaced-apart primary and secondary mirrors each of convex curvature corresponding to a segment of a hemisphere. The mirror system is adapted to be positioned at a selected location along an energy-receiving surface so as to have incident on the primary mirror any image at such position of the projected area of an energy-radiating surface. The primary mirror reflects such image to the secondary mirror which redirects the image through a central aperture in the primary mirror to a lens system that focuses the image at an image plane for photographic recordation and reproduction. The instrument is very small and it also provides an image available for reproduction or other use at the image-forming assembly, both of which factors enable the instrument to be used in small spaces and places of limited access which otherwise would not be susceptible to the direct measurement of the thermal radiation geometric configuration factor.

DISCLOSURE

This invention relates to a method of and apparatus for measuring the "radiation geometric configuration factor" (sometimes called simply the radiation configuration factor and occasionally referred to as the geometric view factor or geometric shape factor) which may be defined as the ratio of the radiant energy incident on an energy-receiving surface to the total radiant energy emitted from an energy-radiating surface. While having general utility in this reference, the invention is especially useful for making measurements in enclosures and other spaces of restricted size or having limited access thereto.

There are many environments in which it is either necessary or advantageous to analyze energy transfer problems involving radiated energy (e.g., light and heat), and the thermal design of a space craft is an example thereof. In any such analysis, one of the important parameters is the radiation geometric configuration factor, and such parameter very often presents the greatest uncertainty of all of the factors involved in the analysis. Accordingly, considerable attention and effort are directed to determining its value and in evaluating the extent of any error in such determination. For simple geometries and relationships, the radiation configuration factor can be calculated in a straightforward manner, but as the geometric configurations and relationships become complex, computation of this parameter becomes correspondingly more difficult.

Several approaches have been devised for determining the value of any particular radiation configuration factor, and one such approach requires the use of a digital computer program with the mathematical description of the energy-receiving and radiating surfaces being required as input information. Such a computer program can be a highly accurate procedure for determining a radiation configuration factor, but it also can be very time consuming and requires the availability of a detailed description of the geometries of the two surfaces of interest. Another approach involves direct measurement of the radiation configuration factor at the energy-receiving surface of an existing model or system, and such measurements can then be compared to the analytical predictions therefor or they can be used directly in radiation analyses and design computations.

Evidently, any approach using direct measurement of the radiation configuration factor makes it possible to determine rapidly the influence of environmental and other changes in a model or system (a spacecraft for example) which changes constitute a very important part of a thermal analysis. However, although many experimental techniques have been developed for direct measurement of the radiation configuration factor, most such techniques have little practical use because of the physical size limitations they impose and the general complexities they entail and, as a consequence, only a few of those techniques have had any practical use and those that have are generally based, at least in part, on a unit-hemisphere method of measurement which makes use of a geometric description of the integrand in the integral equation defining the thermal radiation configuration factor. The result of such method is an image of the projected area of the energy-radiating surface at the energy-receiving surface and which area is proportionate to the radiation configuration factor.

An object of the present invention is to provide an improved method of an instrument for directly measuring the radiation configuration factor of an existing energy-receiving and energy-radiating surface system irrespective of the geometric complexities of the surfaces or complexities of the geometric relationships existing in the system. Another object of the invention is in the provision of an instrument or apparatus for directly measuring such radiation configuration factor, and which instrument is not inhibited or restricted in its use by size limitations and general complexities.

Still another object is that of providing an instrument of small physical size so as to be usable in locations that otherwise would be inaccessible, and which instrument is always ready for use since it does not require calibration for conditions peculiar to each location at which a measurement is to be made. Yet another object of the invention is that of providing an instrument having a wide field of view, and which instrument is operative to form an image directly within the instrument itself, thereby enabling measurements to be made within restricted spaces having limited access and without the requirement of elaborate instrumentation and the requisite room necessary therefor.

Additional objects and advantages of the invention will become apparent as the specification proceeds with a discussion of the the particular embodiments of the invention illustrated in the accompanying drawings in which:

FIG. 1 is a diagrammatic view illustrating the unit-hemisphere technique for determining the radiation configuration factor of a surface system or model;

FIG. 2 is a diagrammatic view of an instrument embodying the present invention for determining such radiation configuration factor;

FIG. 5 is a plan view of a configuration factor grid used in determining the radiation configuration factor of such system;

FIG. 6 is a diagrammatic view of a pair of surfaces constituting a test model; and FIG. 7 is a plan view of an image of one of the surfaces shown in FIG. 6 taken at a point along the other surface, and with the grid of FIG. 5 being superimposed thereon.

Figure 3:
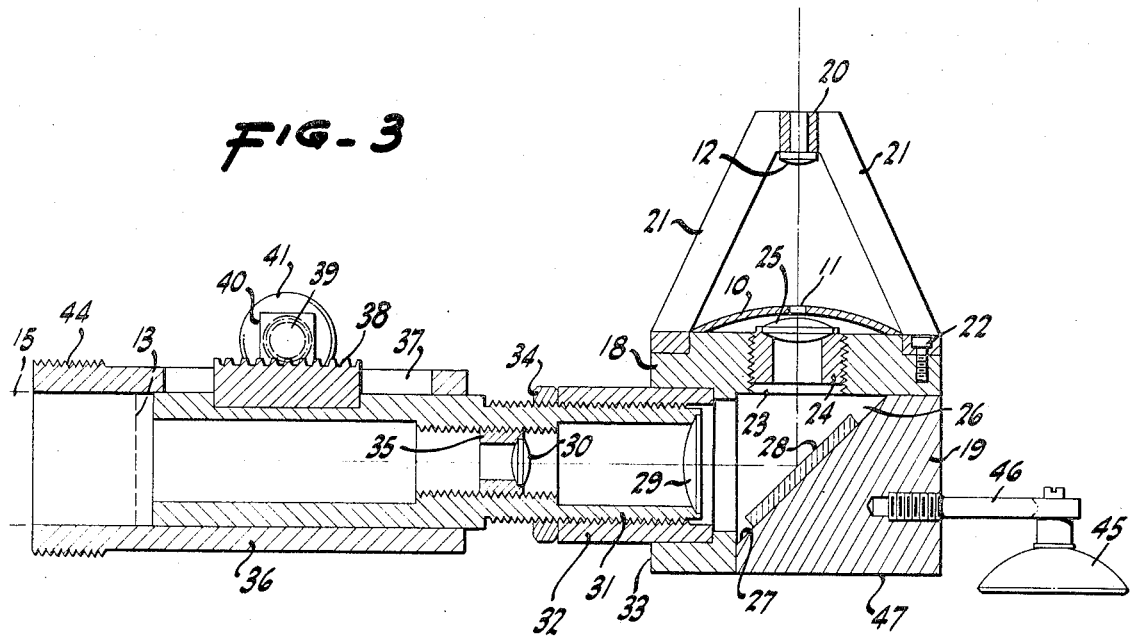
FIG. 3 is an enlarged, longitudinal section view through the sensing head or image forming assembly of the instrument shown diagrammatically in FIG. 2.

As indicated hereinbefore, various techniques have been developed for determining radiation configuration factors analytically, and one such technique is based on a system of coordinates using the aforementioned unit-hemisphere method. For purposes hereof, and as previously stated, the radiation configuration factor is taken to be that fraction of the total radiant energy emitted by an energy-radiating surface which is incident on an energy-receiving surface. In the drawings, and sometimes hereinafter, the energy-radiating surface is denoted $dA_1$ and the energy-receiving surface is denoted $dA_2$. It may be noted that there is not universal agreement on a definition for radiation configuration factor, and the existing disagreement generally concerns whether the words "diffusely emitting surface" are an understood part of the definition. The more general definition is intended herein in which the surfaces of interest are not necessarily diffusely emitting, but with certain restrictions and explanations as hereinafter set forth.

First, the radiation configuration factor is taken to be a fraction that is a function of the geometric orientation between the energy-radiating surface $dA_1$ and energy-receiving surface $dA_2$, as well as a function of the directional emittance of the surfaces. In cases in which both surfaces are diffuse, the configuration factor is a function of the geometry only of the two surfaces, and then the well known reciprocity relationships are valid as indicated subsequently in the mathematical analysis. In cases in which one or more surfaces exhibit directional properties, the reciprocity relationships do not obtain. An instrument embodying the present invention is useful in evaluating the radiation configuration factors between both types of surfaces (diffuse and directional), and can be valuable in indicating cases in which the reciprocity relationships are invalid.

The geometric relationships depicting the unit-hemisphere technique for analytically describing the radiation configuration factor are illustrated in FIG. 1 with the energy-radiating surface being denoted $dA_1$ and the energy-receiving surface being denoted $dA_2$ and comprising a part of an irregular area $A_2$ of greater size. A straight line joining the spaced areas $dA_1$ and $dA_2$ is denoted with the letter "$l$" and is of length "$r$" and it forms angles $\phi_1$ and $\phi_2$, respectively, with normals "$n_1$," "$n_2$," respectively extending from surfaces $dA_1$ and $dA_2$.

The net radiant energy transmitted from $dA_1$ to $dA_2$ is defined as $$dq_{1-2} = I_1 \cos \phi_1 \, dA_1 \, d\omega_2 - I_2 \cos \phi_2 \, dA_2 \, d\omega_1 \quad (1)$$

where $I_1$ and $I_2$ the intensity of the energy in the direction of normals $n_1$ and $n_2$ respectively and $d\omega_1$ and $d\omega_2$ are solid angles defined as $$d\omega_1 = dA_1 \cos \phi_1 / r^2$$

and $$d\omega_2 = dA_2 \cos \phi_2 / r^2. \quad (2)$$

Substituting such solid angle equalities into Equation 1 and collecting terms gives $$dq_{1-2} = (\cos \phi_1 \cos \phi_2 \, dA_1 \, dA_2 / r^2)(I_1 - I_2). \quad (3)$$

Using the definition of radiosity $J = \pi I$ for a uniform diffuse surface, $J \neq f(\lambda, A_1, A_2)$, the following equation obtains:

$$q_{1-2} = J_1 - J_2 \int_{A_1} \int_{A_2} \frac{\cos \phi_1 \cos \phi_2 \, dA_1 \, dA_2}{\pi r^2}. \quad (4)$$

From this equation, the configuration factor $F_{1-2}$ is defined as the double integral:

$$F_{1-2} A_1 = \int_{A_1} \int_{A_2} \frac{\cos \phi_1 \cos \phi_2 \, dA_1 \, dA_2}{\pi r^2}. \quad (5)$$

When the surfaces have been defined as diffuse emitters, as in this derivation, the reciprocity theorem follows:

$$F_{1-2} A_1 = F_{2-1} A_2. \quad (6)$$

For evaluation of a configuration factor from a point to a surface, the unit-hemisphere method is properly employed. Again from FIG. 1, the surface $dA_1$ is in the base plane of a hemisphere of unity radius. The surface $A_2$ is "seen" by the surface $dA_1$ through the solid angle $d\omega_2$. The surface $A_2'$ is inscribed in $d\omega_2$ on the hemisphere surface. Mathematically, this projection is represented as $$d\omega_2 = (dA_2 \cos \phi_2 / r^2) = [dA_2 \cos \phi_2 / (l)] = dA_2'. \quad (7)$$

With this equation, the radiation configuration factor equation (Equation 5) written for an elemental area $dA_1$, becomes:

$$F_{1-2} dA_1 = dA_1 \int_{A_2} \frac{\cos \phi_1 \cos \phi_2 \, dA_2}{\pi r^2}$$

$$= dA_1 \int_{A_2'} \frac{\cos \phi_1 \, dA_2'}{\pi}. \quad (8)$$

For the hemisphere, $dA_2''$ is proportional to $\cos \phi$, that is $dA_2'' = dA_2' \cos \phi_1$. Thus, Equation 8 may be further reduced and the radiation configuration factor determined as $$F_{1-2} = \int_{A_2''} \frac{dA_2''}{\pi} = \frac{A_2''}{\pi} \quad \text{with} \quad (9)$$

$A_2''/\pi$ = the ratio of the projected area to the total base area

The unit-hemisphere technique as utilized in the instrumentation embodying the present invention, and the measurements made thereby are evidently valid for diffusely emitted surfaces. In other cases, evaluation of photographs of the images provided by the instrument will indicate the presence of specular surfaces and the contribution thereof to an effective radiation configuration factor, thereby allowing extended analytical consideration of such surfaces.

A diagrammatic view of an instrument embodying the present invention is shown in FIG. 2 and it is seen to comprise a primary mirror 10 shaped so as to constitute a segment of spherical surface, which surface in FIG. 2 finds its counterpart in the hemisphere enclosing the surface $dA_1$ shown in FIG. 1. The primary mirror 10 has a centrally disposed aperture 11 formed therein, and in line with the aperture 11 at a spaced distance from the convex surface of the primary mirror 10 is a secondary mirror 12. Generally, the image forming assembly comprising the primary mirror 10 and secondary mirror 12 defines an inverse cassegrainian optical system that depicts a full pi (hemisphere) field of view. A direct image is formed by the system at an image plane 13 within the assembly, and for focusing the image thereat an intermediate optical system 14 is provided. The image formed at the image plane 13 can be transmitted to a remote location through an optical transmitter 15 which may comprise a conventional bundle of coherent fiber optics filaments.

The intermediate optical system 14 generally constitutes several positive lenses effective to control the size and position of the image transmitted thereto by the secondary mirror 12. The image distribution is controlled by the shapes of the primary and secondary mirrors 10 and 12, and in order to conform to the prior-described unit-hemisphere method, a reduction in the size of the viewed object would be provided which is proportional to the cosine of the azimuth angle. However, an image distribution of this type results in objects at large azimuth angles being severely reduced in size in the final image thereof, wherefore a more useful distribution is one that reduces the image by approximating the cosine at smaller azimuth angles and enlarges or spreads the image at larger azimuth angles. However, such variable image distribution requires the use of a special grid for viewing the resultant image to determine the radiation configuration factor, but the geometric requirements for any such grid are readily determined as by means of a computerized ray trace program; and by employment thereof, investigation has established that a convenient and useful curvature for the primary and secondary mirrors to provide an acceptable image distribution is a spherical curvature. Thus, in FIG. 2 both the primary mirror 10 and the secondary mirror 12 have spherical curvatures or are segments of a sphere.

In this reference, exemplary ray traces are illustrated in FIG. 2 and demonstrate that a ray denoted 16 originating at a large azimuth angle approaching 90° relative to a perpendicular line drawn from the image plane 13 through the aperture 11 is reflected from the convex primary mirror 10 to the convex secondary mirror 12 which redirects such ray through the aperture 11 to the image plane 13 adjacent an outer extremity thereof. Similarly, a ray 17 of small azimuth angle approaching a condition of parallelism with such perpendicular line drawn from the plane 13 through the aperture 11 is reflected by the mirror 10 to the mirror 12 which redirects the ray through the aperture 11 to the image plane 13 adjacent the center thereof.

A structural embodiment of the image forming assembly generally depicted in FIG. 2 is shown in FIG. 3 and includes the aforementioned spherical primary mirror 10 and sperical secondary mirror 12 spaced therefrom and aligned with the central aperture 11 in the primary mirror 10. The primary mirror 10 is adhesively or otherwise fixedly secured to the outer surface of a casing component 18 which is a separate element secured to the body portion 19 of the casing by any suitable means such as cap screws, not shown. The secondary mirror 12 is fixedly related to the primary mirror 10 and casing part 18 carrying the same by being adhesively attached to a hollow collar or lens cell 20 that is rigidly connected to a plurality (there being three in the form shown) of outwardly converging supports or struts 21 each of which is attached to the case component 18, as by means of cap screws 22.

The casing part 18 has a large central opening 23 therein aligned with the aperture 11 in the primary mirror 10, and positioned within the opening 23 is a hollow support sleeve or lens cell 24 that carries a positive lens 25 forming a part of the intermediate optical system 14 heretofore discussed.

The body portion 19 of the casing is cut at an angle to provide a chamber or compartment 26 therewithin underlying the lens 25, and the angular or inclined surface 27 of such body portion forms one wall of the compartment. The surface 27 is disposed at a 45° angle relative to the primary axis of the lens 25, and secured to such surface 27 is a mirror or reflecting lens 28 which also forms a part of the intermediate optical system 14 and is operative to direct the image focused thereonto by the mirror 12 along an optical axis oriented perpendicularly to that established by the secondary reflecting lens 12 and positive lens 25.

The optical axis defined by the direction change enforced by the mirror 28 constitutes the principal axis of a pair of longitudinally spaced lenses 29 and 30 which focus such redirected image onto the aforementioned image plane 13 which is coincident with the end of the coherent fiber bundle 15. The lens 29 is supported at the end of an elongated hollow tube or cylindrical support sleeve 31 that is externally threaded to receive thereon an internally threaded collar or plug 32 press fitted into an opening therefor in a casing element 33 fixedly secured to the casing body portion 19 by cap screws or other suitable means, not shown. The support sleeve 31 is fixedly constrained with respect to the plug 32 by a lock ring 34 threadedly circumjacent the cylinder 31 and bearing against the plug at an end thereof.

The lens 30 is supported within a hollow collar or lens cell 35 pressed into the sleeve 31 generally near the center thereof. Circumjacent the cylinder 31 adjacent its outer end is an elongated sleeve coupling or connector 36 slidable longitudinally along the cylinder 31. The connector sleeve 36 has an elongated slot 37 formed along one side thereof, and extending upwardly into the slot 37 is a rack 38 fixedly related to the cylinder 31 as by being press fitted into a mating recess provided therealong. The connector sleeve 36 is evidently slidable longitudinally along the cylinder 31 within the limits defined by the slot 37 and rack 38 which engages a gear 39 rotatedly carried by a support 40 and equipped with an enlarged hand wheel or knurled knob 41 to facilitate rotation thereof.

Rotation of the gear 39 selectively in opposite angular directions causes the connector sleeve 36 to be displaced along the cylinder 31, thereby changing the spacing between the image plane 13 and lens 30. It will be apparent that such displacements of the image plane, which is contained within the connector sleeve 36, can be used to properly locate the plane so as to have a sharp image focused thereon by the intermediate optical system comprising the lenses 25, 29 and 30 of the mirror 28. The image plane 13 is coincident with the end or face of the fiber bundle 15, as shown in FIG. 3, and such bundle is confined within a flexible conduit 42 (FIG. 4) removably secured to the connector sleeve 36 by a nut 43 adapted to engage external threads 44 provided by the sleeve 36 at the outer end thereof.

In using the image forming assembly shown in FIG. 3, it is located along any surface (the previously mentioned reciprocity relationship could enable a radiating surface to be a receiving surface for measurement purposes) involved in measurement of a radiation configuration factor and as a matter of convenience, the assembly may be provided with means for releasably securing the same to such surface. As shown in FIG. 3, the particular means used in the embodiment of the invention being considered comprises a resilient suction cup 45 of conventional design carried by an arm 46 having a threaded end received within a threaded bore provided therefor in the casing body component 19. Ordinarily the suction cup 45 along the perimetric surface-engaging lip thereof projects below the bottom wall 47 of the casing body portion 19 so that it can be pressed into engagement with a surface to be tested before such surface is touched by the bottom wall 47 of the assembly. Evidently other arrangements may be used to removably secure the instrument to a surface including manual positioning thereof.

Figure 4:
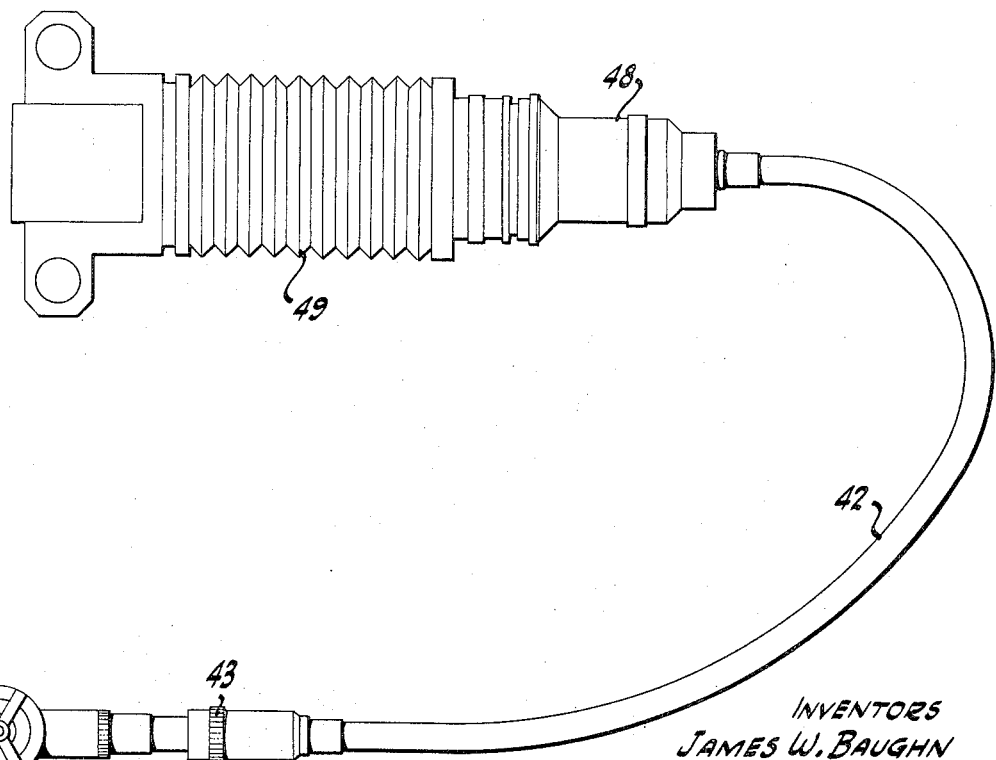
FIG. 4 is a side view in elevation illustrating apparatus embodying the invention.

The assembly or instrument shown in FIG. 3 is operative to form an image directly at the instrument itself along the image plane 13 thereof, and such image is then usefully employed in determining the radiation configuration factor of the test surfaces involved. Although such image can be used at the instrument itself, it is often convenient to transmit or conduct the image to a remote location and which transmission thereof is effected by the fiber optics bundle 15. Referring to FIG. 4 such bundle, which at one end thereof is connected to the sleeve 36, is at its other end coupled through a bellows 48 to the entrance aperture of a camera 49 attached to the bellows so as to make a photographic record or photograph of the image transmitted by the fiber optics bundle from the image plane 13.

By way of specific example, the camera 49 may be a Nikon F, 35 mm camera and in such event the bellows 48 used to adapt such camera to the system contains a lens having a magnification of 3.5. The coherent fiber optics bundle used in association therewith consists nominally of 675,000 fibers each of about 10 microns in diameter and has a resolution of 45 line pairs per millimeter. The coherency or relative position of fibers in the image format is ± 0.0024 inches in a 8 × 10 mm image format. The particular length of the fiber optics bundle is not critical although some loss in illumination accompanies any lengthening of the bundle, but lengths up to 6 feet can be used with very little loss of illumination.

To use the instrument, it is simply positioned on any receiving surface along which measurements are to be made in determining the radiation configuration factor thereof as respects some radiating or object surface from which incident energy originates. An image of such radiating surface will appear on the primary mirror 10, and the size of such image will be equivalent to the area thereof seen by or projected onto the mirror 10, as explained hereinbefore. The image of such object or radiating surface is reflected from the primary mirror to the secondary mirror 12 which redirects the same through the aperture 11 from which it is focused at the image plane 13 by the intermediate optical system comprising the lens 25, mirror 28, lens 29 and lens 30. A record of such image is made for study as by making a photograph thereof. In the particular apparatus considered such image is transmitted from the principal image plane to a remote location for photographic recordation by the camera 49.

If the radiation configuration factor is to be determined at only one point along a receiving surface being investigated, the instrument need be placed only at such point and a photograph made of the image of the radiating surface at such particular point. Often, however, the radiation configuration factor involving an entire receiving surface is desired, and in such case separate measurements are made at a number of typical points along the receiving surface and the average value of such measurements is then taken to be the value of the radiation configuration factor for the entire surface. Evidently, the more measurements that are made at typically representative points, the more nearly accurate will be the resultant average value derived from the measurements.

The instrument is quite small so that it can readily reach otherwise inaccessible locations, and by way of example the diameter of the casing component 18 in one specific embodiment of the invention is about 1½ inches and the distance between the lens-receiving surface of the components 18 and upper surface of the lens cell 20 is slightly over 1 inch. As a result, the instrument can be placed in corners and other locations that ordinarily would not be accessible for direct measurement or could have such complex geometries that analytical computation of the radiation configuration factors therefor would be wholly impracticable.

As explained hereinbefore calibration of the instrument is required (i.e., provision of a calibration grid) because of the image size distribution being a function of the azimuth angle and the image being spread at large angles. Accordingly, the extent of such spread must be determined in order to obtain a calibration grid. Such a grid is shown in FIG. 5 and is intended to overlay a photographic reproduction of the image to be measured. The grid contains a plurality of polygonal areas differing in size in accordance with the size distribution of the image, and the radiation configuration factor at any point along a receiving surface constitutes the ratio of the number of such polygonal areas or elements of the grid enclosing the photographic image of the radiating surface at such point to the total number of grid elements. The grid shown in FIG. 5 can be established by a direct method in which a flat disc of known radius "$a$" is placed with its center directly above the instrument so as to be normal to the optical axis of the primary lens 10. The configuration factor for such disc is related to the distance "$L$" from the mirror to the grid by the following expression:

$$F = a^2/a^2 + L^2.$$

With $a$ a known constant (the disc radius), the distance $L$ can be selected initially for a radiation configuration factor of 0.1 and a circular image obtained therefor. The procedure is then repeated consecutively for configuration factors of from 0.2 through 0.9, and it is found that the circular images differ in diameter. The circular images are then combined to form a set of concentric image annuli, wherefore the area between any two successive circles defining an image annulus corresponding to a difference of 0.1 in radiation configuration factors. The grid is completed by drawing radial lines of equal angular spacing through the origin of the disc to divide each image annulus into a plurality of closed grid elements of equal area and provide calibration for the desired image distribution. In the specific configuration factor grid 50 shown in FIG. 5, the nine concentric image annuli respectively bounded by the successive concentric circles totalling 10 in number are angularly subdivided by 20 radial lines 51 so that each of the resultant polygonal areas or grid elements 52 lying between any two successive radials 51 is somewhat rectangular and represents a configuration factor of 0.005 (i.e., 0.1 divided by 20).

By way of illustrating a specific instance in which the grid 50 is used to determine a radiation configuration factor, the geometric relationships shown in FIG. 6 will be employed in which the radiating surface is a rectangle denoted "$A_2$" having a height "$H$" and a width "$W$." This rectangular geometry is amenable to a closed-form exact solution and is given by the relationship (see Hamilton and Morgan publication entitled "Radiant Interchange Configuration Factors," published in NACA TN-2836, 9152):

$$F_{dA_1} - A_2 = \tfrac{1}{2}\pi[\tan^{-1}(l/L) - VL \tan^{-1} V]$$

where $V = I \sqrt{N^2 + L^2}$
$N = H/W$ (From FIG. 6)
$L = d/w$ (From FIG. 6).

The point at which the configuration factor is to be measured, and at which the instrument is placed, is denoted $dA_1$.

It will be apparent that the contribution to the configuration factor made by that portion of the radiating surface $A_2$ nearest the point $dA_1$ is much greater than the contribution made by that portion of the surface $A_2$ most remote from the point $dA_1$. Thus the image of the surface $A_2$ projected onto the sperical mirror 10 located at the point $dA_1$, and which image is used to determine the configuration factor, will not be rectangular and in fact only the vertical side of the surface $A_2$ closest to the point $dA_1$ will remain undistorted and be a straight line in this image appearing on the mirror 10. Generally, only lines which coincide with radial lines on the calibration grid are undistorted in the final image. Evidently, as the distance "$d$" between the radiating surface $A_2$ and the measuring point $dA_1$ increases, the size of the image projected by the surface $A_2$ onto the mirror 10 decreases. The configuration factor corresponding to any point $dA_1$ is determined by overlaying the calibration grid 50 on a photographic reproduction of the image of the radiating surface $A_2$ made at such point and by then counting the grid elements 52 overlying the image.

A photographic reproduction is shown in FIG. 7 of an image formed at a distance $d = 24.0$ inches of a rectangular area $A_2$ having a height "$H$" of 64 inches and a width "$W$" of 96 inches. The image of such surface area corresponds to the light portion denoted in the aggregate with the numeral 54, and is seen to encompass a total of 32 elements 52 on the overlaid grid 50. Since each such element 52 denotes a radiation configuration factor of 0.005, such factor multiplied by the number of elements ($0.005 \times 32$) equals a configuration factor of 0.16 which substantially corresponds to the exact solution determined by the aforementioned expression for an exact solution.

In order to determine the configuration factor over an entire receiving surface $A_1$ rather than at a single point $dA_1$, it is necessary to make a number of measurements at selected points and then integrate for the entire area. For example, $$F_{A_1-A_2} = \frac{\int_{A_1} F_{dA_1-A_2} dA_1}{A_1} \approx \sum_{A_1} \frac{F_{\Delta A_1 - A_2} \Delta A_1}{A_1}$$

Clearly, selection of the various points for measurement requires care and proper weighing of the measured values. In this respect, a convenient means of estimating changes in the configuration factor along a receiving surface is by visual observation of the radiating surface through a single lens reflex camera at different points along the surface. The accuracy of the approximations made by such visual observations can be improved by using points having small changes in the visually-observed configuration factors as the selected points for placement of the image-forming assembly.

It will be evident that the size of the energy-emitting surface is not a critical factor and for purposes hereof, a surface of very small area (approaching a point source, for example) is an energy-emitting surface. Irrespective of the size of the emitting surface, the apparatus is a direct imaging device with the image being formed within the image-forming assembly.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. In a radiation configuration factor measuring apparatus wherein the radiation configuration factor between an energy radiating surface and an energy receiving surface is determined by forming an image of the energy radiating surface at a location on the energy receiving surface and then measuring the area of said image which area is normally proportional to the radiation configuration factor and which normally decreases as the radiation configuration factor decreases; the improvement comprising:

a. optical means for expanding the area of said image by increasing amounts as the angle between the energy radiating surface and an axis perpendicular to said energy receiving surface at said location increases to prevent the said normal decrease in the area of said image as the radiation configuration factor decreases; and b. reference means for being compared with the area of said expanded image to determine the radiation configuration factor between said surfaces.

2. Apparatus as recited in claim 1 wherein said reference means comprises a calibration grid having a plurality of grid elements each of which represent an equal fraction of radiation configuration factor, said grid elements varying in size in proportion to the expansion in the area of said image by said optical means; and further comprising means for aligning said grid with said expanded image such that the radiation configuration factor may be determined by multiplying the total number of grid elements covered by said expanded image with the fraction of radiation configuration factor represented by each grid element.

3. Apparatus as recited in claim 1 and further including means for transmitting said expanded image to a remote location for comparison with said reference means.

4. Apparatus as recited in claim 3 and further including means for recording said expanded image at said remote location, and wherein said reference means comprises a calibration grid superimposed over said recorded image.

* * * * *